(12) United States Patent
Tandon

(10) Patent No.: US 10,093,864 B2
(45) Date of Patent: *Oct. 9, 2018

(54) METHOD AND APPARATUS FOR CONTINUOUS RECYCLING OF WASTE PLASTIC INTO LIQUID FUELS

(75) Inventor: Amit Tandon, Panchkula (IN)

(73) Assignee: Amit Tandon, Panchkula, Haryana (IN)

( * ) Notice: Subject to any disclaimer, the term of this patent is extended or adjusted under 35 U.S.C. 154(b) by 708 days.

This patent is subject to a terminal disclaimer.

(21) Appl. No.: 14/126,854

(22) PCT Filed: Jun. 16, 2012

(86) PCT No.: PCT/IB2012/053046
§ 371 (c)(1),
(2), (4) Date: Dec. 17, 2013

(87) PCT Pub. No.: WO2012/172527
PCT Pub. Date: Dec. 20, 2012

(65) Prior Publication Data
US 2014/0121426 A1    May 1, 2014

(30) Foreign Application Priority Data

Jun. 17, 2011 (IN) .......................... 1730/DEL/2011

(51) Int. Cl.
*C10G 1/10* (2006.01)
*C10G 31/10* (2006.01)
(Continued)

(52) U.S. Cl.
CPC .............. *C10G 1/10* (2013.01); *C10B 47/30* (2013.01); *C10B 53/07* (2013.01); *C10G 1/002* (2013.01);
(Continued)

(58) Field of Classification Search
CPC .... F23G 5/027; F23G 5/20; F27B 7/10; F27B 7/20; F27B 7/30; C10G 31/10;
(Continued)

(56) References Cited

U.S. PATENT DOCUMENTS 1,636,270 A * 7/1927 Young ....................... C10B 1/10
                                                    202/131
1,664,723 A * 4/1928 Young ..................... C10B 47/30
                                                    201/5
(Continued)

FOREIGN PATENT DOCUMENTS

DE              394635 C  *  4/1924   ........ F26B 11/0409
JP         2004045013 A  *  2/2004

*Primary Examiner* — Steven B McAllister
*Assistant Examiner* — Steven Anderson, II

(57) ABSTRACT

A method and system (100) is provided for continuous recycling of waste plastic feedstock into liquid fuels. The method includes sending the feedstock into a rotary retort vessel at an input end of the rotary retort vessel. The feedstock is received on either sides of a partition structure, wherein the partition structure connects the input end of the rotary retort vessel to an output end of the rotary retort vessel. The feedstock is pyrolized in the rotary retort vessel, wherein the feedstock produces gaseous byproducts and non-gaseous byproducts. The byproducts are moved towards the output end of the rotary retort vessel, wherein the movement is facilitated by declination of the rotary retort vessel and the one or more partition structures. The non-gaseous byproducts are continuously removed from the rotary retort vessel.

17 Claims, 4 Drawing Sheets

(51) Int. Cl.
  *C10G 33/00* (2006.01)
  *C10G 35/00* (2006.01)
  *C10G 47/00* (2006.01)
  *C10G 1/00* (2006.01)
  *F27B 7/16* (2006.01)
  *C10G 69/06* (2006.01)
  *C10G 69/08* (2006.01)
  *C10B 47/30* (2006.01)
  *C10B 53/07* (2006.01)

(52) U.S. Cl.
  CPC ............. *C10G 31/10* (2013.01); *C10G 33/00* (2013.01); *C10G 35/00* (2013.01); *C10G 47/00* (2013.01); *C10G 69/06* (2013.01); *C10G 69/08* (2013.01); *F27B 7/167* (2013.01); *C10G 2300/4081* (2013.01); *C10G 2300/80* (2013.01); *Y02P 20/143* (2015.11); *Y02P 40/126* (2015.11)

(58) Field of Classification Search
  CPC .... C10G 33/00; C10G 35/00; C10G 2300/80; C10G 69/06; C10G 69/08; C10L 347/30
  See application file for complete search history.

(56) References Cited

U.S. PATENT DOCUMENTS

| | | | | |
|---|---|---|---|---|
| 2,246,252 A | * | 6/1941 | Hummel | A21C 11/00 34/109 |
| 3,814,401 A | * | 6/1974 | Davis | C21D 9/0031 266/133 |
| 4,094,769 A | * | 6/1978 | Brown | C10B 47/44 201/33 |
| 4,361,100 A | * | 11/1982 | Hinger | C02F 11/06 110/110 |
| 2004/0182001 A1 | * | 9/2004 | Masemore | C10B 7/10 48/197 FM |
| 2005/0241992 A1 | * | 11/2005 | Lott | B01J 27/047 208/108 |
| 2008/0128259 A1 | * | 6/2008 | Kostek | B01D 5/0006 201/4 |
| 2009/0145392 A1 | * | 6/2009 | Clark | B01F 3/0811 123/1 A |
| 2010/0096588 A1 | * | 4/2010 | Gadewar | C01B 7/01 252/182.32 |
| 2010/0240937 A1 | * | 9/2010 | Gartside | C07C 4/02 585/315 |
| 2011/0011722 A1 | * | 1/2011 | Rinker | C10B 51/00 201/32 |
| 2011/0068036 A1 | * | 3/2011 | Ji | B09B 3/0075 206/524.1 |
| 2011/0278150 A1 | * | 11/2011 | Mulqueen | C05D 9/00 201/36 |
| 2014/0097075 A1 | * | 4/2014 | Tandon | F23G 5/027 202/131 |
| 2015/0368564 A1 | * | 12/2015 | Wheeler | C10B 1/10 202/83 |

* cited by examiner

METHOD AND APPARATUS FOR CONTINUOUS RECYCLING OF WASTE PLASTIC INTO LIQUID FUELS

BACKGROUND

Field

The embodiments relate generally to the field of recycling, and more particularly but not exclusively, to continuous conversion of waste plastics into liquid fuels.

Discussion of Related Field

Increased global consumption of non-renewable materials, such as, crude oil, coal and natural gas is leading to a rapid depletion of their finite natural reserves. Today, the need, therefore for developing economically feasible and scalable technologies that can recycle products which are manufactured using such non-renewable material cannot be over-emphasized.

Plastics are polymers manufactured from feedstock derived from non-renewable crude oil. The manufacturing and consumption of plastics has increased substantially over the years. However, once consumed, the plastic material is not easy to dispose, as it does not biodegrade naturally. Consequently, plastic waste is a large strain on existing disposal methods, which include landfill and incineration. Landfill space is becoming scarce and expensive, a problem exacerbated by the fact that plastic waste is more voluminous than other waste type. On the other hand, incineration of plastics to recover energy, produces toxic gaseous products, which only shifts a solid waste problem to an air pollution one.

Mechanical recycling remains the dominant method to recycle plastic wastes. However, such recycling is limited by the compatibility between different types of polymer resins. Presence of a polymer dispersed in a matrix of a second polymer may dramatically change the properties and hinder the possibilities to use it in the conventional applications. A good example of this is the impacts of polyvinyl chloride (PVC) during polyethylene terephthalate (PET) processing. A small amount of PVC in the recycled PET strongly reduces the commercial value of the latter. Another problem with mechanical recycling is the presence of different colors in plastic waste of products made of the same resin, which usually impart an undesirable grey color to the recycled plastic.

Current methods for management of plastic wastes face a host of challenges. Technological solutions, which accepts commingled different resin plastics often lack commercial viability for scaling and replication. Further, the high cost of recycling plastics as per a specific resin code (e.g. separation of HDPE from mixed plastic waste) and the low cost of virgin plastic with which recycled plastic has to compete also poses challenge to recycling of plastic wastes.

Owing to issues with mechanical recycling, land filling and incineration of waste plastics, the emphasis has increased recently for development of pyrolytic methods which use heat (thermal) or heat and catalyst (thermocatalytic) in an inert atmosphere for degradation of waste plastics to obtain liquid fuels. During pyrolysis, the polymeric materials are heated to high temperatures, such that the macromolecular hydrocarbon chains contained in them are scissioned (cracked) and broken into smaller hydrocarbon chains. This results in formation of gaseous and liquid products which have a wide distribution of carbon number. The major pyrolytic products coming from such a process can be divided into:

i. A hydrocarbon liquid fraction, which comprises of paraffins, iso-paraffins, olefins, napthenes and aromatics and has a gross calorific value between 18900-20700 BTU/lb ii. A gas fraction, which comprises mostly of C1-C4 hydrocarbon gases, which are uncondensable at normal atmospheric pressure and ambient temperature iii. Solid residual char, which comprises carbon (coke) from thermal degradation of polymer along with any feedstock contaminants, such as, mud, dirt, sand, sludge, additives etc.

Thermal cracking of waste plastic feedstock in the absence of catalyst requires higher energy input and often yields low economic value mixtures of hydrocarbons (mostly waxes), which having very broad compositional range, sometimes extending from light alkane gases to heavier solid hydrocarbons in the range upto C80. The product stream coming from thermal cracking of plastics needs intensive post-processing for it to be useful and of high economic value.

To solve the challenge of degradation of plastic wastes to generate useful lighter fuels, it is therefore necessary to establish optimal pyrolytic process conditions and catalyst(s), so as to obtain petroleum fuels directly from the process, which can be used as commodity fuels with reasonable amount of post-processing and refining. Compared to thermal degradation, thermocatalytic degradation using optimal reaction catalyst(s) and process conditions generates liquid fuels having a narrower carbon number distribution with a high percentage of the liquid fuel being in the C5-C24 range. When hydrocarbon-rich plastics such as HDPE, LDPE, PP, PS are used as feedstock, 4.0-7.0 barrels of light & middle petroleum distillates may be generated from one tonne of feedstock.

To enable thermocatalytic degradation, pulverized mixed waste plastics are pyrolyzed in an inert atmosphere in a pyrolysis reactor. The pyrolysis process results in formation of gaseous and non-gaseous byproducts. The catalyst may be added to the pyrolytic reactor itself (liquid phase reaction) as a certain percentage by weight of incoming waste plastic. In another method (vapor phase reaction), the gaseous byproduct coming from the pyrolysis reactor is reacted with a fixed amount of catalyst contained in a fixed, moving or fluidized catalytic reactor. The catalyst promotes the scissioning (cracking) of longer hydrocarbon chains in the evolved gaseous byproduct to form smaller length hydrocarbon chains, which are then condensed to obtain lighter fuel oils.

One of the challenges corresponding to pyrolysis is the removal of non-gaseous residual byproducts from the pyrolysis reactor. It shall be noted that if non-gaseous byproducts are not removed from the pyrolysis reactor, then the overall efficiency of pyrolytic degradation shall reduce, since such residual byproducts interfere with transfer of heat to incoming feedstock.

In one of the techniques, a mixture of plastics and tire scrap is fed to a batch pyrolytic reactor equipped with a special mixer, which agitates the feedstock during the pyrolysis process. In this semi-continuous system, raw materials are fed to the pyrolytic reactor for some time and the main byproducts are liquids and gases, which are collected separately. The residual matter, which is a mixture of carbon char, feedstock impurities and inorganic matter, remains in the pyrolytic reactor. At the end of the production cycle, the pyrolytic process is stopped and the rotational direction of agitating mixer is reversed, such that the mixer arms now scrape residual material from the reactor walls. The main disadvantage of this arrangement is a semi-continuous working mode and relatively low output from the production plant.

In U.S. Pat. No. 6,866,830, a fluidized-bed is used to pyrolytically treat mixed waste plastics. While fluidized-bed reactor has numerous advantages, such as, improved heat transfer to the plastic, continuous dosing of catalyst (through an online regenerator) and continuous removal of coke deposited on the catalyst, nevertheless, fluidized-bed pyrolysis of plastics has problem related to stickiness of the sand particles (the fluidization medium) that becomes coated with fused plastic. This may require a continuous withdrawal of bed material that must be substituted with a make-up of fresh material.

In Canadian patent 1127575, a horizontal pyrolytic reactor is used. The reactor receives feedstock at a first end, and the gaseous and non-gaseous byproducts of pyrolysis are removed from a second end. The movement of the feedstock and the byproducts from the first end to the second end is enabled by a screw conveyer that extends along the length of the reactor. Usage of such a screw conveyer decreases the volumetric space available for feedstock in the reactor. Further, byproducts might stick to the surface of the screw conveyers and lead to undesirable effects.

In various methods related to conversion of plastic waste to useful fuels, it has been studied that, to remove non-gaseous residue from the pyrolysis reactor, the pyrolytic apparatus often includes elaborate mechanisms such as irregular shaped metal scrapers, which scrape the inside walls of the pyrolytic reactor. Such scrapers typically consist of an assembly of shafts and blades. These shafts and blades take away valuable volumetric space which would have otherwise been available to the feedstock, thereby leading to an increase in the size of the pyrolytic reactor. Further, the scraping assembly to be effective, needs to maintain precisely the requisite gap from the pyrolysis reactor side-walls. This makes the efficacy of the scraping assembly vulnerable to mechanical fatigue, wear and tear, vibrational and other forces during the pyrolytic process. Further, the pyrolysis process has to be stopped from time-to-time for removal of such accumulated non-gaseous residue from the pyrolysis reactor leading to loss of energy and process productivity. U.S. Pat. No. 6,777,581 for example, uses a pyrolytic chamber with an auger positioned at its base for scraping the residual material and carbon char deposits. Char removal is only activated when the vessel is cooled.

Hence, in light of the foregoing discussion, there is a need for technique which provides a mechanism for pyrolytic conversion of waste plastics into liquid fuel oils and which includes a cost-effective and robust mechanism for continuous removal of non-gaseous residual matter from the pyrolysis reactor without the need to halt the process.

SUMMARY

Accordingly the invention provides method for continuous recycling of waste plastic feedstock into liquid fuels wherein the non-gaseous residual matter is continuously expelled from the pyrolytic reactor without the need to halt the recycling process. The method includes sending the feedstock into a rotary retort vessel at an input end of the rotary retort vessel, wherein the rotary retort vessel is rotating. The feedstock is received on either sides of one or more partition structures, wherein the partition structures connects the input end of the rotary retort vessel to an output end of the rotary retort vessel. The feedstock is pyrolyzed in the rotary retort vessel, wherein the feedstock produces gaseous byproducts and non-gaseous byproducts, wherein the gaseous byproducts comprise hydrocarbon vapors. The byproducts are moved towards the output end of the rotary retort vessel, wherein the movement is facilitated by angular motion of the rotary retort vessel, it's declination and the one or more partition structures. The non-gaseous byproducts are continuously removed from the rotary retort vessel, wherein at least a part of the non-gaseous byproducts move over the surface of the partition structures toward the output end of the rotary retort vessel and exit the rotary retort vessel.

There is also provided a system for continuous recycling of waste plastic feedstock into liquid fuels, the system comprising an apparatus for pyrolyzing the feedstock, wherein the apparatus comprises a rotary retort vessel configured to be heated. The rotary retort vessel comprises an input end configured to receive the feedstock continuously and an output end configured to allow byproducts of pyrolysis to exit the rotary retort vessel, wherein the rotary retort vessel is declined towards the output end with respect to the input end. Further, at least one partition structure is provided along the length of the rotary retort vessel, wherein the partition structure facilitates continuous expelling of non-gaseous byproducts from the rotary retort vessel.

These and other advantages of the present invention will be clarified in the description of the embodiments taken together with the attached drawings in which like reference numerals represent like elements throughout.

BRIEF DESCRIPTION OF DRAWINGS

Embodiments are illustrated by way of example and not limitation in the Figures of the accompanying drawings, in which like references indicate similar elements and in which.

DETAILED DESCRIPTION

Figure 1:
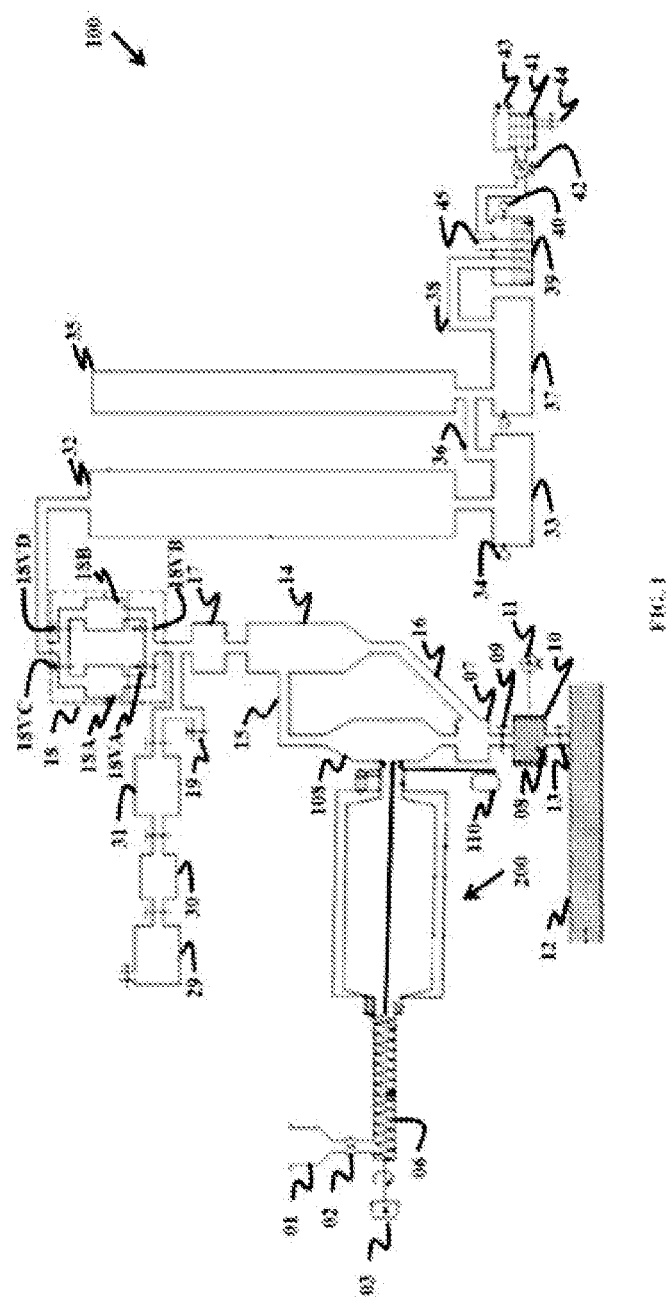
FIG. 1 schematically illustrates a system 100 for recycling waste plastics into liquid fuels, in accordance with an embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Embodiments disclose continuous recycling of waste plastic into liquid fuels. The waste plastics that are recycled into liquid fuels are obtained by segregating a mixture including various types of polymeric waste material, generally referred to as mixed plastic waste. Mixed plastic waste generally includes High-density polyethylene (HDPE), Low-density polyethylene (LDPE), Polypropylene (PP), polystyrene (PS), Polyvinyl chloride (PVC), Polyvinylidene chloride (PVDC), Polyethylene terephthalate (PET), Nylon, Polymethylmethacrylate (PMMA), Polycarbonates (PC) among other materials. It is well known that plastic material such as PVC, PVDC, PET, Nylon, PMMA and PC include hetero atoms such as Cl, O, and N, S, Br, I, P which when pyrolized produce organic and inorganic compounds, which unless neutralized contaminate the resultant condensate. Hence, plastic resins having such hetero atoms (referred to as "undesirable material") may be segregated from mixed waste plastic to obtain a stream of waste plastic that may, to a large extent, contain hydrocarbon material without hetero atoms, such as, HDPE, LDPE, PP and PS, among other materials (referred to as "desirable material"), which then eventually undergo pyrolysis for conversion to liquid fuels.

Segregation of mixed plastic waste into undesirable material and desirable material, and thereby allowing only desirable material to undergo pyrolysis, reduces hetero compound and acidic vapor formation during pyrolysis. The reduction in formation of hetero compounds and acidic vapor, facilitates the use of a simple method and system, and results in production of liquid fuels of superior quality.

Segregation of mixed plastic waste into undesirable material and desirable material is enabled by offloading mixed plastic waste onto a conveyer belt. The conveyer belt is configured to move at a predetermined speed. The conveyer belt moves the offloaded mixed waste plastic towards one or more Near Infrared (NIR) sensors. The NIR sensors captures NIR wavelength of the material passing through it. The NIR wavelength captured by the NIR sensors is communicated to a Data Processing System (DPS). The DPS analyses the NIR wavelength to determine the resin code of the material that has passed through the NIR sensor. The DPS further determines whether the material that has passed through the sensor is a desirable material or an undesirable material based on the resin code. Based on such determination, the DPS sends instructions to one or more air ejector units to blow air and segregate undesirable material from the desirable material. The segregated desirable material can be further processed before subjecting the same to pyrolysis. As a result of such segregation, formation of acid vapor and hetero atom compounds during pyrolysis is substantially reduced.

The segregated desirable material to a large extent includes polymer resins, such as, HDPE, LDPE, PP, PS and other similar polymeric material having long hydrocarbon chains. The desirable material is shredded into desired size, for example 10 millimeters by 10 millimeters. Thereafter, any contaminants, such as, organic matter, which might be stuck to the material may be removed using conventional techniques, such as vibration based separators. Other conventional techniques for removal of contamination and moisture from the desirable material may also be used. The order in which such techniques may be applied to the desirable material may be interchanged. The shredded and processed desirable material that is ready to be pyrolyzed for generation of fuel is referred to as feedstock. The feedstock may be thermally heated before being fed to the process.

FIG. 1 schematically illustrates a system 100 for recycling waste plastics into liquid fuels, in accordance with an embodiment. The feedstock, which has to be recycled is fed to hopper 1. The feedstock in hopper 1 passes through an rotary air lock feeder 02 and enters a screw conveyer 06. It shall be noted that the rotary air lock feeder 02 is provided to stop gaseous byproducts that are produced by pyrolyzing the feedstock from escaping into atmosphere. Rotary air lock feeders that are well known in the art can be used as air lock feeder 02. After the feedstock passes through the rotary air lock feeder 02, the feedstock enters the screw conveyer 06, which is driven by a motor 03. The screw conveyer 06 transmits the feedstock to a pyrolysis reactor 200.

In an embodiment, the feedstock coming into the pyrolysis reactor 200 may be uniformly pre-mixed with one or more chemical and catalytic materials using methods known in the art. The chemicals and catalytic materials used are mixed with the feedstock in desired fixed ratios and serve to lower the activation energy required for thermal scissioning of bonds during feedstock pyrolysis and/or assist in neutralization of any vapors containing hetero atoms, which are produced during feedstock pyrolysis.

Figure 2:
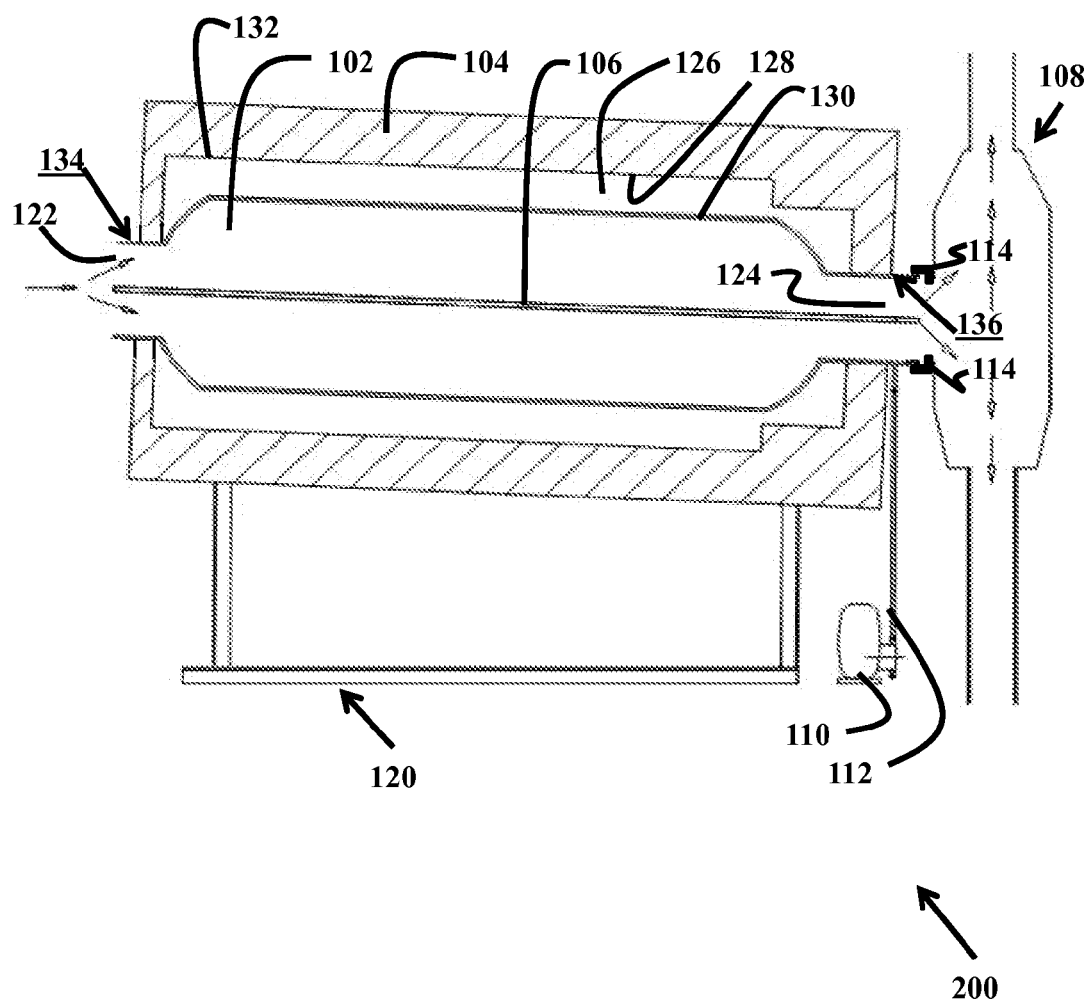
FIG. 2 is a schematic cross sectional side view of the pyrolysis reactor 200 for enabling thermal degradation of feedstock, in accordance with an embodiment.
Figure 3:
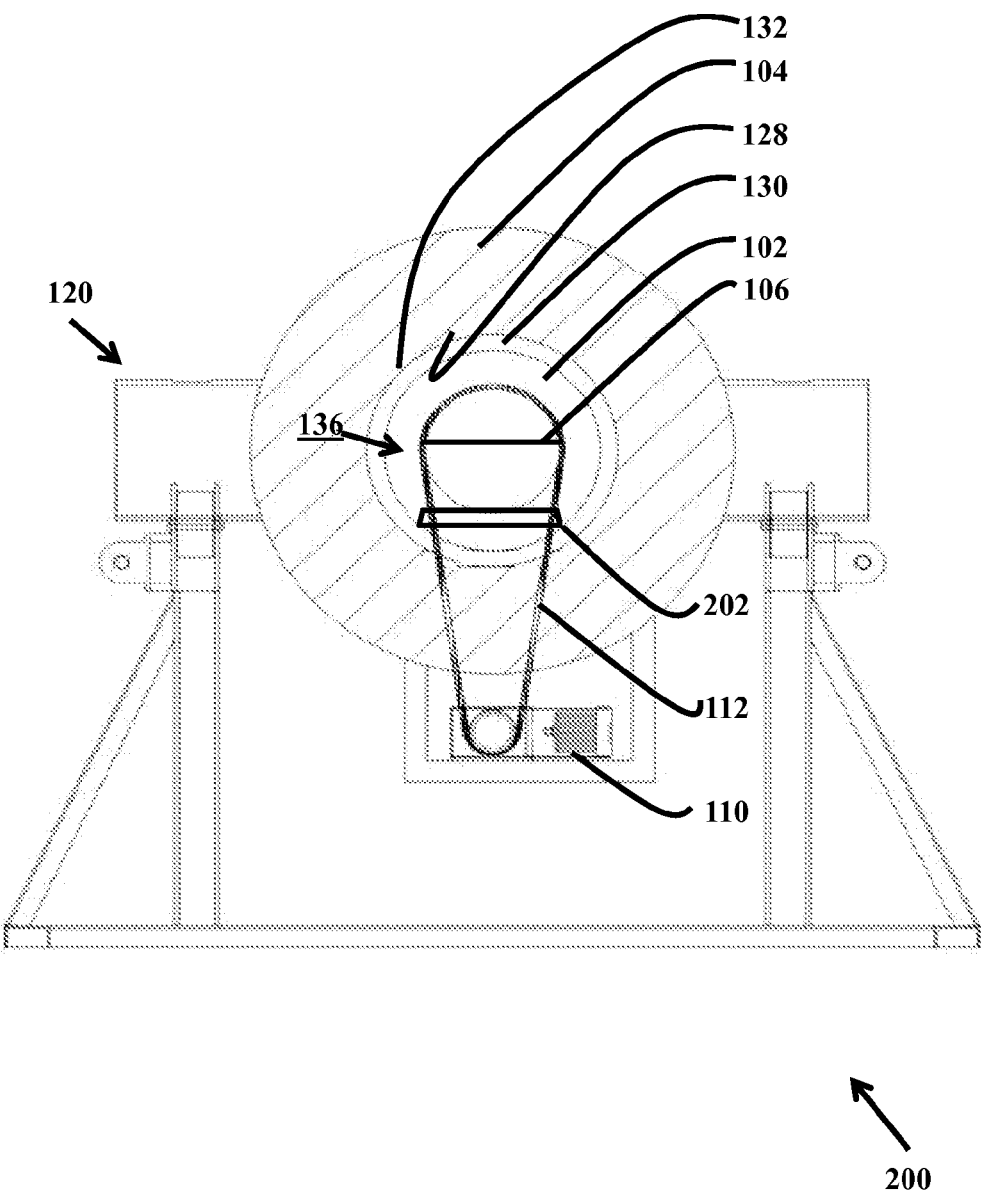
FIG. 3 is a schematic cross sectional rear view illustrating a tilting mechanism 120 for tilting a rotary retort vessel 102, in accordance with an embodiment.

FIG. 2 is a schematic cross sectional side view of the pyrolysis reactor 200 for enabling thermal degradation of feedstock, in accordance with an embodiment. The pyrolysis reactor 200 includes a rotary retort vessel 102, an insulation structure 104, a shell 132, a partition structure 106, a motor 110, a belt 112, a leak-proof seal 114, tilting mechanism 120 and roller arrangement 202 (illustrated in FIG. 3).

Rotary retort vessel 102 includes an input end 122 and an output end 124. The input end is configured to receive continuously (or if desired in batches) feedstock, which has to pyrolyzed, while the output end 124 is engaged with downstream process equipment such as a gas-residue separator 108, to which the byproducts of thermal decomposition are passed.

Further, rotary retort vessel 102 has positive declination toward the ground. In other words, distance between the ground and a point, which is closer to the output end 124, on the longitudinal axis of the rotary retort vessel 102 is lesser than the distance between the ground and a point, which is closer to the input end 122, on the longitudinal axis of the rotary retort vessel 102. The positive declination facilitates movement of feedstock, intermediate products of decomposition and residual matter (solid or liquid) which may be formed as a byproduct during pyrolysis, towards the output end 124, due to gravity.

The rotary retort vessel 102 may be declined using means known in the art such as a tilting assembly which uses a worm wheel or hydraulic cylinder arrangement or like tilting arrangement. The rotary retort vessel 102 may be declined using an arrangement 120 illustrated in FIG. 3.

In light of the foregoing discussion, it shall be noted that rotary retort vessel 102 can be configured to be declined at a predetermined angle while a thermocatalytic degradation plant is being built. Alternatively, the angle of declination can be configured based on instant requirement of thermocatalytic degradation plant operation.

The rotary retort vessel 102, in addition to having a declination, which facilitates movement of non-gaseous byproducts towards the output end 124, also includes at least one partition structure 106, which facilitates movement of feedstock, intermediate products of decomposition and residual matter towards the output end 124. The partition structure 106 connects the input end 122 to the output end 124. Further, in an embodiment, the partition structure is provided in such a way that it divides the rotary retort vessel 102 into two volumetrically equal zones. It shall be noted that more number of partition structures 106 can be provided to divided the rotary retort vessel 102 into more number of volumetrically equal zones.

In an embodiment, partition structure 106 may be heated. Heating of the partition structure 106 can improve homogeneous heating of the feedstock. In an embodiment, partition element 106 can be hollow structure (in part or in entirety), wherein heating element can be accommodate in hollow sections to enable heating of the partition structure 106. It may be noted that, generally when the rotary retort vessel 102 is heated, the intensity of heat is greater near the circumference of the rotary retort vessel 102 as compared to the intensity of heat near the longitudinal centre of the rotary retort vessel 102. The difference in the intensity of heat might not be substantial in case the rotary retort vessel 102 is of smaller cross section. However, as the size of the rotary retort vessel 102 increases, the difference in the intensity of heat may also increase, thereby resulting in less homogeneous heating of the feedstock. Hence, by heating the partition structure 106, the difference in intensity of heat can be reduced, thereby resulting in enhanced homogeneous heating of the feedstock.

The rotary retort vessel 102, which includes the partition structure 106, is covered with suitable insulation structure 104 to mitigate thermal losses from the system. In an embodiment, the rotary retort vessel 102 is included inside a metal shell 132 in such a way that an empty space 126 is defined between the inner surface 128 of the shell 132 and outer surface 130 of the rotary retort vessel 102. It shall be noted that the feedstock shall need to be heated in the retort vessel 102 in an inert atmosphere and in the absence of atmospheric air for conversion to petroleum fuels. The rotary retort vessel 102, and thereby the feedstock, is heated either directly by pressurized, high-velocity flame burners, which push large volume of heated air into the empty space 126 or indirectly by circulation of hot air or other such media coming from a generator into the empty space 126.

In an embodiment, the rotary retort vessel 102 is heated to a temperature, which is in the range of 400 degree Celsius to 600 degree Celsius. It shall be noted that the temperature range to which rotary retort vessel 102 is heated can vary based on one or more of, residence time of the feedstock in the rotary retort vessel 102, technique adopted for degradation of feedstock (Example: thermal or thermocatalytic degradation), in case thermocatalytic degradation is adopted, then the phase at which cracking is enabled (Example: liquid phase cracking or vapor phase cracking), among other factors.

In an embodiment the rotary retort vessel 102 can be made from material having high corrosive strength such as SS-316 or Hastelloy or other similar material, which provides for corrosion resistance to any acidic vapors that may be produced inside the rotary retort vessel 102.

In an embodiment, a pressurized, high-velocity flame burner system can be used to push heated air into the empty space 126, thereby heating the rotary retort vessel 102. Such a burner system may use at least partially the off-gases coming from the pyrolytic recycling plant itself as fuel for combustion or utilize commodity fuel such as LPG/CNG as fuel. The placement of burners and flue gas exit (not shown in diagram) in such an embodiment shall be in accordance with standard principles of combustion engineering along the rotary retort vessel's 102 outer wall 130. The flue gas exiting from the retort shell 132 may be passed through a gas-air heat exchanger, where thermal heat of the flue gas is used to heat atmospheric air which comes into the heat exchanger at ambient temperatures. The air so heated is routed back to the burner and used for heating the rotary retort vessel 102.

In another embodiment, in addition to using a burner system or independently, the rotary retort vessel 102 and thereby the feedstock can be heated using air or similar heat transferring media (such as thermic fluid) from a generator. The generator can use, at least partially, the off-gas from the pyrolytic degradation plant as fuel or it may use a commodity fuel such as LPG/CNG or use electrical heaters to heat the thermal transferring media. The heated media is then circulated into the empty space 126 in a closed loop.

In another embodiment, the rotary retort vessel 102 and thereby the feedstock, can be heated by electrical heaters. The placement of electrical heaters in such an embodiment shall be in accordance with standard principles of combustion engineering along the rotary retort vessel's 102 outer surface 130.

The rotary retort vessel 102 is heated while being rotated. The rotation of the rotary retort vessel 102, in one embodiment, can be enabled by configuring a belt or slotted chain 112 around the rotary retort vessel 102. The belt or slotted chain 112 is driven by a motor-gear assembly 110. The angular speed of rotation of the retort can be controlled using the motor-gear assembly mechanism and a variable frequency drive (VFD), which is connected to the motor.

The rotating vessel 102 is supported by multiple roller assemblies, which may be positioned along the base of the rotary nose 134 & 136. Depending upon the length of the rotary retort vessel 102, the number of rollers deployed to support the rotary retort vessel 102, as well as their location along the base of the rotary retort nose is determined in accordance with standard principles of engineering. For illustration, a single roller assembly 202 is shown at the base of retort nose 136 in FIG. 3.

To prevent gases from retort vessel 102 to escape into any non-process equipment or into the atmosphere, the input end 122 and output end 124 may be mated with upstream and downstream stationary equipment respectively using stationary leak-proof seals or similar equipment known in the art. For the purpose of illustration, FIG. 2 shows such a seal 114 which mates the rotating nose 136 of the retort vessel with the stationary gas residue separator 108.

In another embodiment, the input end 122 and/or the output end 124 of the rotary retort vessel 102 can have a nose-heater mounted on it to ensure that vapors produced as a result of thermal decomposition do not condense at the inlet and/or exit end.

Further, the output end 124 is engaged with downstream process equipment such as a gas-residue separator 108. The gas-residue separator 108 facilitates separation of gaseous byproducts from non-gaseous byproducts. The byproducts resulting from the thermal degradation move towards the output end 124 and enter the gas-residue separator 108. The gaseous byproducts after entering the gas-residue separator 108 move upwards, while the non-gaseous by products (solids and liquids) move over the partition structure 106 and enter the gas-residue separator 108 and thereupon move downwards into a collection vessel or other downstream process equipment.

The heating of the feedstock produces gases as one of the byproducts. If the pressure at input end 122 happens to be less than the pressure inside the retort, the gases produced tend to escape from the input end 122 of the retort vessel 102. In an embodiment, to prevent condensable gases from escaping from the input end 122, a cooling jacket may be provided near the input end 122. The cooling jacket can be water cooled jacket, wherein low temperature water is circulated into the cooling jacket using a pump, so that water in the cooling jacket is maintained in the desired temperature range. The temperature of the circulating water is kept in accordance to the boiling point of the evolved gases which are to be condensed. It shall be noted that, medium other than water can also be used to achieve the objective of cooling.

During operation (some of the steps, which are well known in the art, involved in beginning of the operation are omitted), motor 110 is switched on, thereby enabling the belt/slotted chain 112 to rotate. The rotating belt/slotted chain 112 in turn enables rotation of the rotary retort vessel 102, which is declined and heated to a desired temperature, to rotate. While the rotary retort vessel 102 is rotating, feedstock is fed into the input end 122 of the rotary retort vessel 102. The feedstock can be fed using mechanisms known in the art, such as screw conveyers, extruders or impeller shafts. The incoming feedstock gets divided and channelized into the partition zones as a result of the partition structure 106 provided in the rotary retort vessel 102. The feedstock starts to gradually move towards the output end 124 because of the declination. As the feedstock starts moving, the feedstock is heated, thereby producing byproducts. The byproducts produced by thermal degradation can include gaseous and non-gaseous byproducts. It shall be noted that, the duration for which the feedstock is retained in the rotary retort vessel 102 can be controlled by varying the speed at which the feedstock is fed, the temperature and pressure inside the rotary retort vessel 102, the angle of declination of the rotary retort vessel 102, the angular speed of rotation of the rotary retort vessel 102 as well as length & diameter dimensions of the rotary retort vessel 102. It shall also be noted that, changes made to such variables shall have an effect on the product produced by thermal degradation of feedstock. The byproducts move towards the output end 124 and enter the gas-residue separator 108. It shall be noted that non-gaseous byproducts may move over the partition structure 106 and enter the gas-residue separator 108. After entering the gas-residue separator 108, the non-gaseous byproducts move downwards into a collection vessel or other process equipment and the gaseous byproducts move upwards.

The non gaseous byproducts coming from the rotary retort vessel 102 are removed from the process on an ongoing, continuous basis using an interconnected block & bleed vessel assembly. The assembly includes vertical cylindrical vessels (block & bleed) which are designed using well understood principles of equipment design and which allow pass-through of the non-gaseous product coming at their inlet (top) end.

One end of the gas-residue separator 108 is connected to a block vessel 07. The non-gaseous byproduct (residue), which includes coke, moves from the separator 108 to the block vessel 07 under the influence of gravity. The block vessel 07 is in turn connected to a bleed vessel 08. Further, an isolation valve 09 is provided between the block vessel 07 and the bleed vessel 08. Furthermore, the bleed vessel 08 is positioned in such a way that, opening the isolation valve 09 would allow non-gaseous byproducts collected in the block vessel 07 to enter the bleed vessel 08. Similarly, closing of the isolation valve 09 would stop non-gaseous byproducts collected in the block vessel 07 from entering the bleed vessel 08.

In an embodiment, the bleed vessel 08 may contain a liquid media which intermixes with the non-gaseous byproducts collected in it to form a slurry that can easily be expelled from the bleed vessel 08. Such liquid media shall be replenished in the bleed vessel from time-to-time as required.

The bleed vessel 08 is provided with a water jacket 10. The water jacket 10 is in turn connected to a pump 11. The pump 11 enables circulation of water to the water jacket 10, so that water in the water jacket 10 is maintained within a desired temperature range. The water jacket 10 enables cooling of the non-gaseous byproducts received from the block vessel 07.

The cooled non-gaseous byproducts are expelled to a conveyer 12, which is connected to the bleed vessel 08. In between the conveyer 12 and the bleed vessel 08, a bleed valve 13 is provided. Opening and closing of the bleed valve 13, respectively enables allowing or stopping non-gaseous material in the bleed vessel 08 from entering the conveyer 12. During thermal degradation of the feedstock in rotary retort vessel 102, the isolation valve 09 is kept open and the bleed valve 13 is closed to allow the bleed vessel 08 to become at least partially full with the non-gaseous byproducts exiting from the rotary retort vessel 102. After temperature of the collected non-gaseous residual byproducts in bleed vessel 08 is within a desired range, which in one embodiment, is below 100 degree Celsius, the bleed valve 13 is opened, after the isolation valve 09 is closed. While the non-gaseous residual byproducts contained in bleed vessel 08 are being expelled to the conveyer 12, any non-gaseous residual byproducts falling through the gas residue separator 108 are collected in the block vessel 07. Once the bleed vessel 08 has been emptied of it's contents, the bleed valve 13 is closed and the isolation valve 09 is opened to allow the bleed vessel 08 to re-collect the non-gaseous residual byproducts exiting the retort vessel 102. Depending upon throughput of non-gaseous residual byproducts exiting the retort vessel, the block and bleed assembly can be sized appropriately to allow for continuous removal of non-gaseous residue material, without the need to stop or halt the pyrolytic degradation process.

While the non-gaseous byproducts are expelled to the conveyer 12, the gaseous byproducts, which include hydrocarbon vapors may be further decontaminated by using a secondary gas-solid separator. FIG. 1, shows an embodiment where a gas-solid cyclone separator 14 is deployed to remove particulate and other solid matter from the gaseous byproducts. The gaseous byproducts enter the gas-solid cyclone separator 14 via an interconnection pipe 15, which connects the gas-solid cyclone separator 14 and the gas-residue separator 108. In the gas-solid cyclone separator 14, any particulate matter accompanying the gaseous byproducts settles down owing to inertia and is passed on to the block vessel 07 via interconnection pipe 16. Thereafter, gaseous byproducts, having reduced particulate matter exit the gas-solid cyclone separator 14 and enter guard bed reactor 17.

The guard bed reactor 17 includes a fixed bed of chemical material(s) which serve to neutralize compounds contained in the gaseous stream which may potentially poison (de-activate) the catalyst(s) contained in catalytic reactor system 18. This measure of neutralization promotes the longevity of catalyst(s) resident in catalytic reactor system 18, which may be poisoned (de-activated) by acidic gases and other contaminants coming along with the gaseous byproducts. The chemical material(s) in the guard bed also help to remove contaminants in the gaseous byproducts such as nitriles, amines, indoles, quinolones, phenols, mercaptans etc. which otherwise would contaminate the resultant condensate.

The chemical material(s) used in the guard bed shall require to be replenished over a period of time. To ensure continuous operation, multiple parallel guard bed paths (not shown in diagram) can be deployed, to ensure that at any given time, the gaseous byproducts percolate over an unexhausted bed of chemical guard bed material(s), while other parallel not-in-use paths at the time are replenished with fresh chemical guard bed material(s), The gaseous byproducts which exit the guard bed reactor 17 enter a fixed bed catalytic reactor system 18. The catalytic reactor system 18 includes one or more reactor paths. In FIG. 1, an embodiment with two reactor 18A and 18B are illustrated. It may be noted that a number of such reactors may be configured together in parallel to ensure use of optimal dimensions of the reactor. When multiple parallel reactors are deployed, only one reactor is kept online at anytime during the run of the process and all other reactors are kept offline. Each reactor contains a fixed bed of single or multiple catalysts which rest upon individual support plates. The catalysts scission (crack) the longer hydrocarbon chains in the incoming gaseous byproducts into smaller hydrocarbon chains, which most of such scissioned chains having less than 25 carbon atoms (C25). The catalyst may also reforms the scissioned hydrocarbon chains by cyclo-alkation, isomerisation and aromatization, thereby improving the characteristics of the liquid fuel produced. While a particular reactor is inline to the process, for example 18A, the other reactors, for example, 18B can be subjected to in-situ (online) regeneration of the spent catalyst contained in it or can be replenished with fresh or regenerated catalyst. To enable the reactors to be online or offline, isolation valves 18VA, 18VB, 18VC and 18VD are provided whose workings shall be apparent to any person of ordinary skill in the art.

In an embodiment, the yield of unsaturated olefins in the liquid hydrocarbon fuel produced, can be reduced by hydrocracking the generated gaseous byproducts coming from 17 with hydrogen over a bi-functional catalyst kept in the fixed bed catalytic reactor system 18. Hydrocracking generates fuel which has more desirable PIONA (Paraffins, Isoparaffins, Olefins, Naphthenes, and Aromatics) characteristics and higher selectivity towards gasoline. The presence of hydrogen also significantly reduced the rate at which coking takes place on the cracking catalyst, with substantial decrease in the kinetics of catalyst de-activation. Hydrogen can be pumped in as a pure gas via hydrogen inlet 19 or can be brought in as superheated steam to the catalytic reactor. For generation of steam, water from water tank 29 is made to enter boiler 30, where the water is heated and the steam generated is superheated in a superheater 31 before being pumped into catalytic reactor system 18.

It shall be noted that all the process apparatus, interfaces and interconnection pipes, which lie in the travel path of the evolved gaseous byproducts starting from their exit from rotary retort vessel 102 and up to their entry into the first condenser 32 are heated using dedicated apparatus heaters or high-temperature heating tapes and are suitably insulated to ensure that the hydrocarbon vapors contained in gaseous byproducts don't condense during transit.

The hydrocarbon vapors exiting catalytic reactor system 18 are condensed using a single or dual stage fractionation column or an array of condensers. FIG. 1 shows an embodiment in which two vertically water cooled heat exchangers/condensers are used to condense the hydrocarbon vapors exiting catalytic reactor system The scissioned and reformed hydrocarbon vapors from the catalytic reactor system 18 are passed to the first vertical condenser 32, which condenses hydrocarbon vapors, which, in an embodiment, have a boiling point distribution higher than 190 C (non-gasoline fraction). The condensed fraction is collected in a surge tank 33 which has an online level indicator 34.

The uncondensed vapors coming from the first vertical condenser 32 are passed serially into the second vertical condenser 35 via interconnection pipe 36. This condenser condenses hydrocarbon fraction of C5 and above (gasoline fraction) present in the incoming uncondensed vapors into surge tank 37. Cold water enters this condenser 35 from a water chiller (not shown) and exits the condenser 35, thereby enabling condensation.

The uncondensed gases from the second vertical condenser 35 are piped via interconnecting pipe 38 to a scrubber tank 39, which includes a wet alkali scrubber, which scrubs impurities related to process emission from the uncondensed gas stream and acts as a water plug. In an embodiment, the gaseous, water-soluble inorganic compounds are removed by scrubbing the uncondensed hydrocarbon gas with caustic soda aqueous stream. In the scrubber tank 39, desulphurization and/or denitrogenation and/or dechlorination occurs. Most of the contaminant gases such as HCl, SO2, SO3, and H2S, among others, resulting from pyrolysis are absorbed in the scrubber. The pH value of the caustic soda in the scrubber tank 39 is measured via an online pH meter 40. Whenever the pH value of the alkali solution in scrubber tank 39 falls to a low value between 7-10, alkali solution from alkali storage tank 41 is automatically added to it using pump 42, so that the pH characteristics of the alkali scrubber are maintained. Tank 41 is provided with inlet 43 and drain 44 for topping-up and draining alkali from the alkali storage tank 41.

The scrubbed and washed uncondensed gases are calorific rich & consist mostly of C1-C4 hydrocarbon gases. They are piped through 45, either to air burners used in the process equipment or are routed to a heated media generator (not shown in figure) where they are combusted and the resultant heated media is used to provide heat to process equipment. The uncondensed gases may also be converted to electricity by using an offgas generator. It should be noted that the scrubbed and washed uncondensed gases may also simply be flared in atmosphere using standard measures of safety.

Further, in an embodiment, the condensed fuel in tanks 33 and 37 may be stabilized with fuel additives that will inhibit polymerization, oxidation, darkening and agglomeration. For each fraction of condensed fuel, pre-selected additives are kept in an additive feed tank. Such additives are blended with the product fraction using a standard liquid blender/static mixer.

Figure 4:
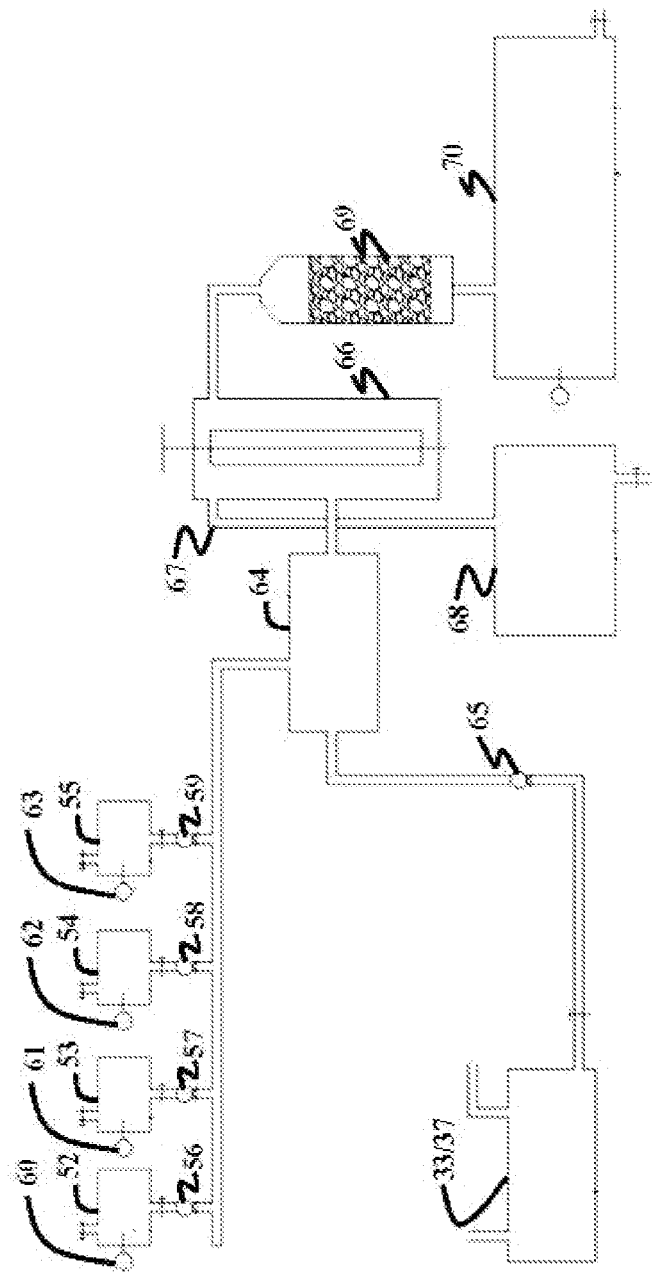
FIG. 4 schematically illustrates a system for blending additives to condensed fuel, in accordance with an embodiment.

FIG. 4 schematically illustrates a system for blending additives to condensed fuel, in accordance with an embodiment. The additives to be added to the condensed fuel are stored in their respective additive storage tanks 52, 53, 54 and 55. Each storage tank has their respective pump 56, 57, 58 and 59 and online level switch 60, 61, 62 and 63, which indicates the level of the additive in the storage tank. Additives stored can include antioxidants, low boiling point and low-octane number additives, high boiling point and high-octane number additives, and additives for improving low temperature properties of the fuel, among other known types of additives. While the embodiment exemplifies blending of 4 additives, any number of additives may be used as desired for the purpose of blending.

The fuel fraction coming from condensers is stored in surge tanks 33 and 37. The number of such surge tanks are not specifically limited by number and multiple surge tanks can be used. The oil fraction stored in the surge tanks 33 and 37 is studied periodically with suitable instruments to determine the blending additives required for meeting prevailing standards related with transportation fuels. Based on such an assessment, a controlled amount of fuel from the surge tanks is pumped to the static mixer/blender 64 using pump 65.

Simultaneously, pre-determined amounts of additives from additive storage tanks 52, 53, 54 and 55 are pumped to the static mixer/blender 64 using pumps 56, 57, 58 and 59, respectively. The static mixer/blender 64 performs an intensive mixing of the incoming streams to generate a single stream, wherein the generated fraction has been blended with the desired additives.

A second level of refining is performed where the blended fuel is sent to a centrifuge/specific gravity based separator 66 where heavy moisture, mulch and other contamination is separated from the fuel and is collected via interconnection pipe 67 into a refuse tank 68. It may be noted here that, based on the additives used for fuel blending, the centrifuge/specific gravity based separation may be performed prior or post the step of blending. The segregated, refined and blended fuel stream coming from centrifuge/specific gravity based separator 66 is then passed through a filter and subsequently through a bed of activated charcoal 69, which serves to de-colorize and de-contaminate the fuel. The final refined stream is collected in a storage tank 70, which has a level switch for automated transfer of its contents into large fuel storage tanks.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and/or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

I claim:

1. A method for continuous recycling of waste plastic feedstock into liquid fuels using a system comprising an apparatus for pyrolyzing the feedstock, wherein the apparatus comprises:

a rotary retort vessel configured to be heated, the rotary retort vessel comprising:
  an input end configured to receive the feedstock;
  an output end configured to allow byproducts of pyrolysis to exit the rotary retort vessel, wherein the rotary retort vessel is declined towards the output end with respect to the input end;
  an input cylindrical portion of uniform diameter disposed towards the input end, an output cylindrical portion of uniform diameter disposed towards the output end, an intermediate cylindrical portion of uniform diameter, a first tapered portion and a second tapered portion, wherein,
    the first tapered portion connects the input cylindrical portion to the intermediate cylindrical portion;
    the second tapered portion connects the intermediate cylindrical portion to the output cylindrical portion; and
    the internal diameter of the intermediate cylindrical portion is greater than the internal diameter of the output cylindrical portions;
  at least one partition structure, wherein the partition structure is a flat plate that extends continuously along the length of the rotary retort vessel from the input end to the output end, and is of a width equal to the inner diameter of the rotary retort vessel; and
a gas-residue separator engaged at the output end of the rotary retort vessel, wherein the partition structure extends up to the output end;
the method comprising:
sending the feedstock into the rotary retort vessel at the input end of the rotary retort vessel, wherein the rotary retort vessel is rotating;
receiving the feedstock on either side of the partition structure;
pyrolizing the feedstock in the rotary retort vessel, wherein the feedstock produces gaseous byproducts and non-gaseous byproducts, wherein the gaseous byproducts comprises hydrocarbon vapors;
moving the byproducts towards the output end of the rotary retort vessel, wherein the movement is facilitated by declination of the rotary retort vessel and the partition structure; and
continuously discharging the non-gaseous byproducts from the rotary retort vessel, wherein at least a part of the non-gaseous byproducts move over the surface of the partition structure toward the output end of the rotary retort vessel and exit the rotary retort vessel.

2. The method according to claim 1, further comprising, segregating mixed waste plastics to eliminate undesirable materials, wherein the undesirable materials comprise hetero atoms.

3. The method according to claim 1, further comprising, adding catalytic material to the feedstock, which lowers the activation energy required for thermal scissioning of hydrocarbon bonds when the feedstock is pyrolyzed.

4. The method according to claim 1, further comprising, adding to the feedstock, chemical material that assists in neutralization of halogenated vapors, which are produced during pyrolysis of feedstock.

5. The method according to claim 1, further comprising, passing the non-gaseous byproducts from the rotary retort vessel to a conveyer through a block system and a bleed system arrangement, wherein connection between the block system and the bleed system is controlled through an isolation valve, and connection between the bleed system and the conveyer is controlled through a bleed valve.

6. The method according to claim 1, further comprising, passing the gaseous byproducts, which comprises hydrocarbon vapor, to a gas-solid cyclone separator, wherein particulate matter accompanying the gaseous byproducts is removed.

7. The method according to claim 1, further comprising, passing the gaseous byproducts through a guard bed reactor, wherein the guard bed reactor comprises one or more chemical materials, which serve to neutralize evolved hetero compounds, acidic gases and catalyst poisons present in the gaseous byproducts.

8. The method according to claim 1, further comprising, passing the gaseous byproducts, which comprises hydrocarbon vapor, through a fixed-bed catalytic reactor system, wherein catalytic materials in the catalyst reactor system crack and reform the hydrocarbon chains present in the hydrocarbon vapor.

9. The method according to claim 1, further comprising, hydrocracking the gaseous byproducts, which comprises hydrocarbon vapor, with hydrogen over a bi-functional catalyst provided in a fixed-bed catalytic reactor system.

10. A system for continuous recycling of waste plastic feedstock into liquid fuels, the system comprising an apparatus for pyrolyzing the feedstock, wherein the apparatus comprises:
  a rotary retort vessel configured to be heated, the rotary retort vessel comprising:
    an input end configured to receive the feedstock;
    an output end configured to allow byproducts of pyrolysis to exit the rotary retort vessel, wherein the rotary retort vessel is declined towards the output end with respect to the input end;
    an input cylindrical portion of uniform diameter disposed towards the input end, an output cylindrical portion of uniform diameter disposed towards the output end, an intermediate cylindrical portion of uniform diameter, a first tapered portion and a second tapered portion, wherein,
      the first tapered portion connects the input cylindrical portion to the intermediate cylindrical portion;
      the second tapered portion connects the intermediate cylindrical portion to the output cylindrical portion; and
      the internal diameter of the intermediate cylindrical portion is greater than the internal diameter of the output cylindrical portions;
    at least one partition structure, wherein the partition structure is a flat plate that extends continuously along the length of the rotary retort vessel from the input end to the output end, and is of a width equal to the inner diameter of the rotary retort vessel; and
  a gas-residue separator engaged at the output end of the rotary retort vessel, wherein the partition structure extends up to the output end.

11. The system according to claim 10, further comprising, a screw conveyer to continuously feed the feedstock comprising polymer to the input end of the rotary retort vessel.

12. The system according to claim 10, further comprising a cooling jacket configured at the input end of the rotary retort vessel.

13. The system according to claim 10, further comprising, one or more near infrared sensors for enabling separation of undesirable materials, which include hetero atoms, from the feedstock.

14. The system according to claim 10, further comprising a block tank connected to a bleed tank through an isolation valve, wherein the block tank and the bleed tank are configured to pass the non-gaseous byproducts from the rotary retort vessel to a conveyer.

15. The system according to claim 10, further comprising a gas-solid cyclone separator, wherein the gas-solid cyclone separator is configured to remove particulate matter accompanying the gaseous byproducts.

16. The system according to claim 10, further comprising a catalytic reactor system, wherein catalytic materials in the catalyst reactor system hydrocrack and reform longer hydrocarbon chains in gaseous byproducts into smaller hydrocarbon chains in the presence of hydrogen, wherein the hydrogen is made available either as a pure gas or is derived from superheated steam.

17. The system according to claim 10, further comprising at least two vertical condensers, wherein a first condenser is provided to condense medium and heavy boiling point fractions and a second condenser is provided to condense light boiling fractions present in the hydrocarbon vapors.

\* \* \* \* \*